United States Patent
Kwack et al.

(10) Patent No.: US 9,720,834 B2
(45) Date of Patent: Aug. 1, 2017

(54) POWER SAVING FOR REVERSE DIRECTORY

(71) Applicant: Oracle International Corporation, Redwood City, CA (US)

(72) Inventors: Jinho Kwack, Santa Clara, CA (US); Joann Lam, Santa Clara, CA (US); Hoyeol Cho, Palo Alto, CA (US); Claire Ni, Santa Clara, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 125 days.

(21) Appl. No.: 14/966,172

(22) Filed: Dec. 11, 2015

(65) Prior Publication Data

US 2017/0168941 A1 Jun. 15, 2017

(51) Int. Cl.
*G06F 12/08* (2016.01)
*G06F 12/0817* (2016.01)
(Continued)

(52) U.S. Cl.
CPC ........ *G06F 12/0822* (2013.01); *G06F 1/3275* (2013.01); *G06F 12/0808* (2013.01);
(Continued)

(58) Field of Classification Search
CPC ............. G06F 12/0811; G06F 12/0808; G06F 12/0831
See application file for complete search history.

(56) References Cited

U.S. PATENT DOCUMENTS 6,684,297 B2* 1/2004 Chaudhry ........... G06F 12/0811
711/122
6,751,706 B2 6/2004 Chauvel et al.
(Continued)

FOREIGN PATENT DOCUMENTS

EP 0637799 A2 2/1995

OTHER PUBLICATIONS

Jichuan Chang and Gurindar S. Sohi, Cooperative Caching for Chip Multiprocessors, Computer Sciences Department, University of Wisconsin-Madison, 12 pages.
(Continued)

*Primary Examiner* — Hashem Farrokh
(74) *Attorney, Agent, or Firm* — Marsh Fischmann & Breyfogle LLC; Daniel J. Sherwinter (57) ABSTRACT

Embodiments include systems and methods for improving power consumption characteristics of reverse directories in microprocessors. Some embodiments operate in context of multiprocessor semiconductors having cache hierarchies in which multiple higher-level caches share lower-level caches. Lower-level cache is coupled with reverse directories associated with respective ones of the higher-level caches. Each reverse directory can be segregated into two reverse sub-directories, one reverse sub-directory for relatively high-frequency accesses (e.g., updating "valid" and/or "private" information), and the other reverse sub-directories for relatively low-frequency accesses updating "index" and "way" information). During a write mode operation, when the reverse directories are updated, the write operation is performed only on the sub-directories having the entries invoked by the update, such that write operations can frequently consume only a fraction (e.g., halt) of the power of a conventional reverse directory write operation.

20 Claims, 5 Drawing Sheets

(51) Int. Cl.
*G06F 12/0811* (2016.01)
*G06F 1/32* (2006.01)
*G06F 12/0808* (2016.01)
*G06F 12/0831* (2016.01)

(52) U.S. Cl.
CPC ...... *G06F 12/0811* (2013.01); *G06F 12/0831* (2013.01); *G06F 2212/283* (2013.01); *G06F 2212/622* (2013.01)

(56) References Cited

U.S. PATENT DOCUMENTS

| | | |
|---|---|---|
| 6,901,450 B1 | 5/2005 | Shimada |
| 6,976,131 B2 | 12/2005 | Pentkovski et al. |
| 7,725,660 B2 | 5/2010 | Carpenter et al. |
| 2002/0152359 A1* | 10/2002 | Chaudhry ........... G06F 12/0808 711/141 |
| 2008/0294837 A1* | 11/2008 | Suda ................... G06F 3/0613 711/103 |
| 2012/0210069 A1 | 8/2012 | Bayer et al. |

OTHER PUBLICATIONS

Tian Tian and Chiu-Pi Shih, Software Techniques for Shared-Cache Multi-Core Systems, Mar. 8, 2012, 9 pages.

\* cited by examiner

POWER SAVING FOR REVERSE DIRECTORY

FIELD

Embodiments relate generally to multiprocessor systems, and, more particularly, to power saving for reverse directories used in multiprocessor systems.

BACKGROUND

Multiple processors are increasingly being used in computational systems to achieve higher rates of computational performance, for example, by facilitating parallel processing of computational tasks. According to some typical configurations, a multiprocessor chip includes multiple processors coupled to multiple levels of cache, and the chip is coupled to a memory. For example, each of the multiple processors can be coupled to its own level one (L1) caches, the L1 caches can be coupled to multiple level two (L2) caches, and the L2 caches can be coupled to (i.e., share) a single level three (L3) caches. The lowest-level (e.g., L3) cache can be coupled to a memory of the computational system. The caches can be used to improve instruction and/or other data access speeds by allowing the processors to perform memory accesses through a hierarchy of caches (i.e., from highest to lowest level cache). For example, rather than going out to the memory to look for data and/or instructions, a processor can look in its local L1 cache, then (if not present in L1 cache) in L2 cache, and so on.

If data is not present in cache, it may be copied from the memory into cache (e.g., from memory to L3 cache, then to L2 cache, then to L1 cache). However, if the same data is copied redundantly (e.g., into multiple L1 or L2 caches) and subsequently modified, the caches may have different versions of the same data (e.g., a "coherency" issue). One conventional approach for addressing coherency issues is to establish a coherency protocol that detects when cached data is modified and updates or invalidates all other cached copies of the data, accordingly. Such an approach typically involves broadcasting update or invalidation messages across a cache data bus (e.g., between the L1 and L2 caches, and/or between the L2 and L3 caches), which can strain bus resources and degrade performance when such messages are frequent.

BRIEF SUMMARY

Among other things, systems and methods are described for improving power consumption characteristics of reverse directories in microprocessors. Some embodiments operate in context of multiprocessor semiconductors having cache hierarchies in which multiple higher-level caches share lower-level caches. For example, some such contexts include a relatively large number of level 2 (L2) caches that share a level 3 (L3) cache. The L3 cache includes (e.g., is coupled with) a reverse directory system that has reverse directories with entries corresponding to lines in the L2 caches. Each reverse directory is segregated into multiple (e.g., two) reverse sub-directories, where at least one of each reverse sub-directories is for relatively high-frequency accesses, and at least another of the reverse sub-directories is for relatively low-frequency accesses. During a write mode operation, when the reverse directories are updated, the write operation is performed only on the sub-directories having the entries invoked by the update. Accordingly, only a percentage of the reverse directory entries (e.g., half) are written during each update, and only a percentage of the power (e.g., half) is consumed for the operation. In some implementations, the reverse sub-directories for relatively high-frequency accesses are for updating "valid" and/or "private" information, and the reverse sub-directories for relatively low-frequency accesses are for updating L3 "index" and "way" information.

According to one set of embodiments, a multiprocessor system is provided. The system includes: multiple processors coupled with multiple higher-level caches; a lower-level cache coupled with higher-level caches, such that each higher-level cache performs memory accesses through the lower-level cache; and a reverse directory system coupled to the lower-level cache and having multiple reverse directories, each reverse directory being associated with one of the higher-level caches and identifying entries in the lower-level cache associated with lines in the associated higher-level cache. Each reverse directory includes: a first reverse sub-directory for higher-frequency memory accesses; and a second reverse sub-directory for lower-frequency memory accesses. Some embodiments are implemented on a single-chip semiconductor.

According to another set of embodiments, a method is provided for reverse directory access in a multiprocessor system. The method includes: receiving an update trigger for updating a reverse directory that is coupled to a lower-level cache and is associated with one of multiple higher-level caches, each higher-level cache coupled with the lower-level cache and with one of multiple processors of the multiprocessor system, the reverse directory being associated with one of the higher-level caches and identifying entries in the lower-level cache associated with lines in the associated higher-level cache, and the reverse directory having a first reverse sub-directory for higher-frequency memory accesses and a second reverse sub-directory for lower-frequency memory accesses; determining, according to the update trigger, whether the update is to directory entries only of the first sub-directory; write-enabling only the first sub-directory when the update is to directory entries only of the first sub-directory; and updating at least one directory entry of the first sub-directory according to the update trigger and subsequent to the write-enabling.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
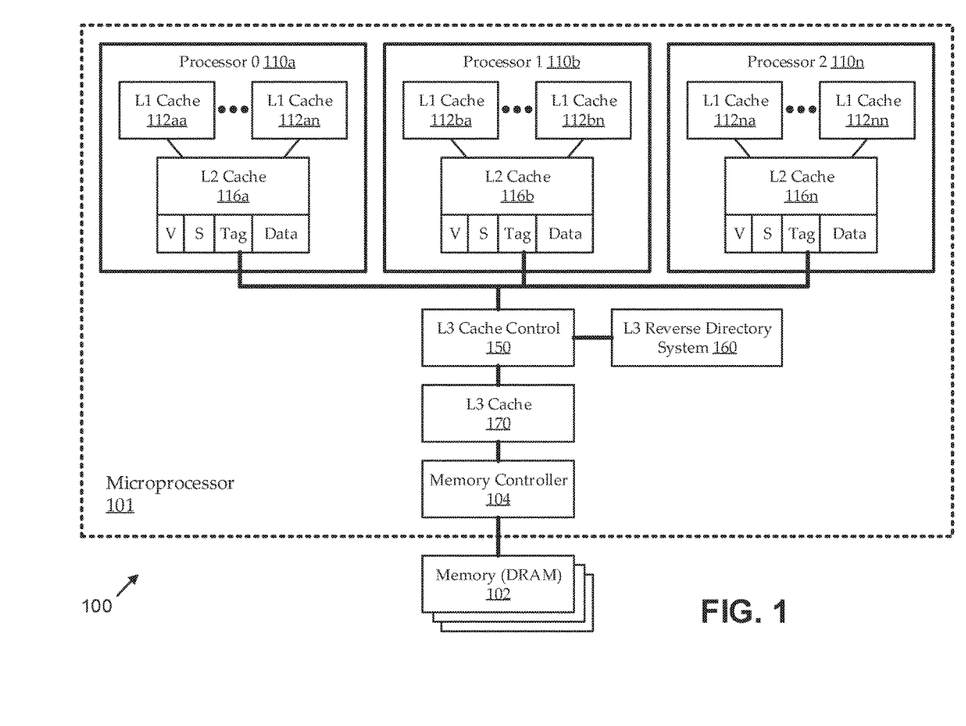
FIG. 1 shows an illustrative multiprocessor system, according to various embodiments.

FIG. 1 shows an illustrative multiprocessor system 100, according to various embodiments. As illustrated, some embodiments include a number of processors 110 implemented in a microprocessor 101, such as an integrated circuit or any other suitable semiconductor. For example, the multiprocessor system 100 can be used to achieve higher rates of computational performance, for example, by facilitating parallel processing of computational tasks. Each processor 110 can include one or more hierarchical levels of cache. For example, the illustrated processors 110 each include multiple highest-level (level one, or L1) caches 112 coupled to a next-level (level two, or L2) cache 116. Each of the L1 caches and/or L2 caches 116 can be implemented as a separate instruction and data cache, as a unified instruction/data cache, and/or in any other suitable manner.

The processor caches (e.g., the L2 caches 116) can be coupled with a lower-level (level three, or L3) cache 170. As shown, the L3 cache can be coupled (e.g., directly or via a cache controller 150) with a L3 reverse directory system 160. The L3 cache can be further coupled with off-chip memory (e.g., dynamic random access memory, or DRAM) 102 through a memory controller 104. The caches can be used to improve instruction and/or other data access speeds by allowing the processors 110 to perform memory accesses through a hierarchy of caches (i.e., from highest to lowest level cache). For example, rather than going out to the off-chip memory 102 to look for data and/or instructions, a processor 110 can look in its local caches (e.g., 112, 116), then (if not present) in L3 cache 170, and so on.

According to some implementations, the higher-level caches (e.g., L1 caches 112 and L2 caches 116) are write-through caches, such that updates to L1 caches 112 automatically propagate to respective L2 caches 116, and further to the L3 cache 170. This can simplify a coherence protocol; for example, if a processor 110 desires a data item present in L2 cache 116, the processor 110 can receive the data from L3 cache 170 without having to wait for L2 cache 116 to source the data. Further, the L2 cache can source the data in such a scenario without relying on a forwarding network. In some implementations, the L3 cache 170 is "inclusive", such that all items in the L2 caches 116 are included in the L3 cache 170 (e.g., and all items in the L1 caches 112 can be included in a respective L2 cache 116).

If data is not present in the caches, it may be copied from the off-chip memory 102 into the caches (e.g., from off-chip memory 102 to L3 cache 170, then to L2 cache 116, then to L1 cache 112). However, if the same data is copied redundantly (e.g., into multiple L1 caches 112 or L2 caches 116) and subsequently modified, the caches may have different versions of the same data (e.g., referred to as a "coherency" issue). One conventional approach for addressing coherency issues is to establish a coherency protocol that detects when cached data is modified and updates or invalidates all other cached copies of the data, accordingly. Such an approach typically involves broadcasting update or invalidation messages across a cache data bus (e.g., between the L1 and L2 caches, and/or between the L2 and L3 caches), which can strain bus resources and degrade performance when such messages are frequent.

Another conventional approach for addressing coherency issues involves adding one or more directories to the caches. The directory can maintain a record of which caches have stored copies of data, such that update and/or invalidation messages can be sent only as needed (i.e., sent to specifically impacted caches, as opposed to broadcast to all caches). While such directory approaches can reduce messaging, some conventional directory implementations can be inefficient. For example, the directories can consume additional storage resources (sometimes wastefully), and directory lookups can be time-consuming.

Another approach for addressing coherency issues is to implement so-called "reverse directories." For example, reverse directories can be coupled to a lower-level cache (e.g., a reverse directory between L1 and L2 cache coupled to L2 cache; and/or a reverse directory between L2 and L3 cache coupled to L3 cache, as illustrated). Each reverse directory can include entries corresponding to lines in the higher-level caches, such that each entry identifies an associated entry in the lower-level cache. For example, the L3 reverse directory system 160 can be used to track a location in L3 cache 170 and to state all the corresponding cache lines residing in any of the L2 caches 116. Hence, such directories can be referred to as "reverse directories" because, instead of keeping a pointer to an L2 entry from each L3 entry, they keep a pointer in the reverse direction to a corresponding 13 entry from each L2 entry. This can provide various features, such as saving memory because there are typically many fewer L2 entries than L3 entries.

Still, using reverse directories for tracking and related functionality can consume power, and the power consumption can increase appreciably as the number of reverse directories increases. In reverse directory implementations, the number of reverse directories at a lower level of cache can be defined according to the number of associated higher-level caches. For example, some high-performance microprocessors can include a large number (e.g., thirty-two) of L2 caches 116, which can cause the shared L3 cache 170 to have a large number (e.g., thirty two) of reverse directories in its L3 reverse directory system 160. Thus, as the number of caches increases, power consumption stemming from operation of the reverse directories can increasing be of concern.

Figure 2:
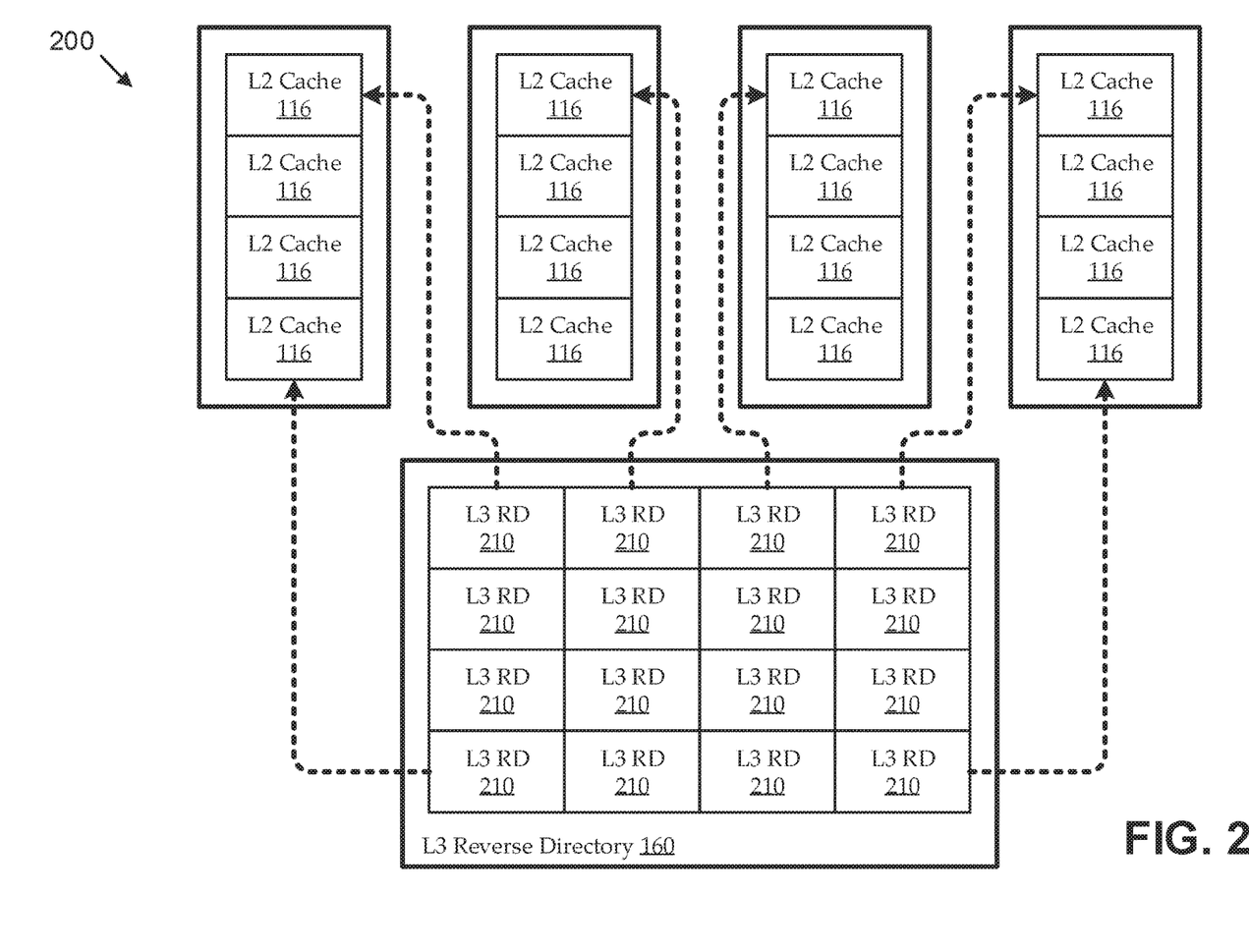
FIG. 2 shows mappings between reverse directories of an illustrative L3 reverse directory and L2 caches, according to various embodiments.

For example, FIG. 2 shows mappings 200 between reverse directories 210 of an illustrative L3 reverse directory and L2 caches 116, according to various embodiments. In particular, the mappings 200 assume a system having sixteen L2 caches 116 and sixteen reverse directories 210, accordingly. As described above, each reverse directory 210 can include entries that track locations in the L3 cache 170 and state all the corresponding cache lines residing in a corresponding one of the L2 caches 116. Each entry can represent a pointer from each L2 cache 116 entry to a corresponding L3 cache 170 entry to facilitate faster cache lookups.

Returning to FIG. 1, embodiments include techniques for improving power consumption characteristics of reverse directories in microprocessors. As described more fully below, the L3 reverse directory system 160 can include a number of reverse directories, and each reverse directory can be segregated into two (or multiple) reverse sub-directories. A first of each reverse sub-directories is for relatively high-frequency accesses, such as updating of "valid" and/or "private" information; and a second of the reverse sub-directories is for relatively low-frequency accesses, such as updating of "L3 index" and/or "L3 way" information. While "valid" and "private" information are referred to herein, such information can be implemented in any suitable manner, for example, as "invalid" and/or "shared" information, respectively. For example, a "private" bit may indicate a certain entry as only applicable to a certain cache when the bit is asserted, and applicable to multiple caches when not asserted; while a "shared" bit may indicate a certain entry as only applicable to a certain cache when the bit is not asserted, and applicable to multiple caches when asserted.

As used herein, "high-frequency" can generally include any suitable types of memory access that occur relatively often, memory accesses involving relatively high-activity, and/or the like; and "low-frequency" can generally include any suitable types of memory access that occur relatively rarely, memory accesses involving relatively low-activity, and/or the like. "High-frequency" and "low-frequency" are intended as probabilistically relative to each other, such that the "high-frequency" memory accesses are likely to occur appreciably more frequently than "low frequency" memory accesses. Write mode operations on conventional reverse directory implementations involve updating all information in the reverse directory. By segregating the reverse directories as described herein, write mode operations can be performed only on the sub-directories having the entries invoked by the update. For example, it is likely that most write mode operations will involve updating of only the reverse sub-directories for relatively high-frequency accesses. Accordingly, only a percentage of the reverse directory entries (e.g., half) are written during each update, and only a percentage of the power (e.g., halt) is consumed for the operation.

While embodiments are described with reference to an L3 reverse directory system 160 coupled with an L3 cache 170, similar or identical techniques can be applied in context of other architectures. For example, some embodiments can include an L2 reverse directory system that has reverse directories for tracking locations in L2 cache 116 and for stating all the corresponding cache lines residing in any of the L1 caches 112. In other embodiments, the lower-level cache(s) (e.g., L2 caches 116 and/or L3 cache 170) can be implemented with multiple banks that can be accessed in parallel by the processors 110 (e.g., through a switch). Each bank can include a corresponding reverse directory, and each bank can have its own memory controller coupled to an associated bank of off-chip memory 102. Such multi-bank architectures can permit concurrent connections between a higher-level cache and respective banks of a lower-level cache, which can increase bandwidth to the lower-level cache.

Figure 3:
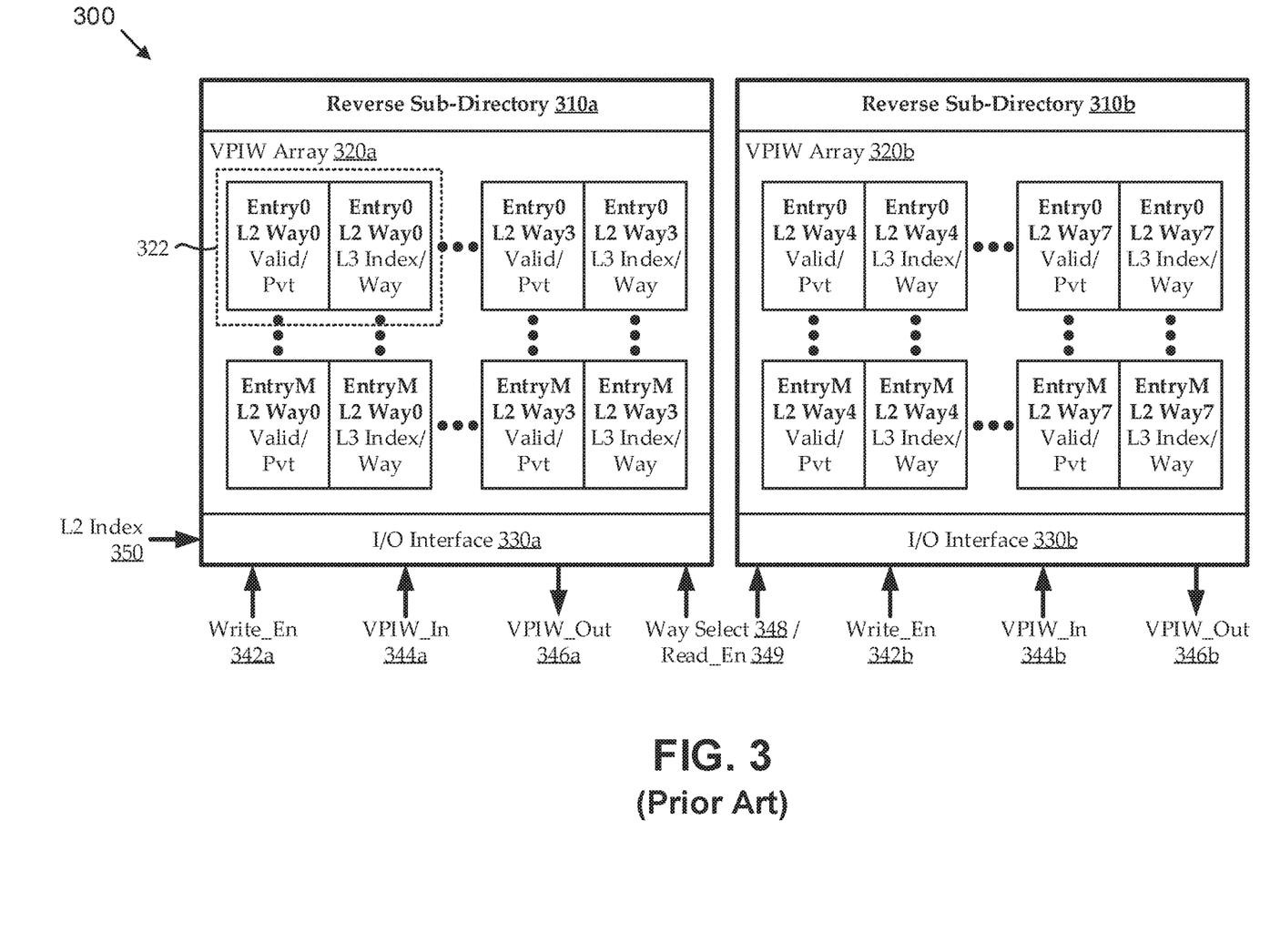
FIG. 3 shows an illustrative conventional reverse directory implementation.

For the sake of context, FIG. 3 shows an illustrative conventional reverse directory 300 implementation. The illustrated reverse directory 300 is assumed to correspond with a particular L2 cache 116, and the reverse directory 300 is assumed to include an entry for each line in the corresponding L2 cache 116. It is further assumed that the L2 cache 116 is organized as an eight-way set-associative cache, such that addressing of the cache 116 can identify a set corresponding to a particular cache row, and the identified set can include eight different entries stored in each of eight different "way locations" (e.g., corresponding to eight columns in the cache). The entries within the L2 cache 116 contain data and instructions, whereas the corresponding entries within the reverse directory 300 contain indexing information specifying a location of the line within the L3 cache 170. To that end, the reverse directory 300 can also be organized according to an eight-way structure similar to that of the corresponding L2 cache 116.

As illustrated, the reverse directory 300 includes two reverse sub-directories 310. The reverse sub-directories 310 can be substantially identical, except that one reverse sub-directory 310a is associated with a first four of the eight ways ("L2 Way0" through "L2 Way3") and the other reverse sub-directory 310b is associated with a second four of the eight ways ("L2 Way4" through "L2 Way7"). Each reverse sub-directory 310 includes a "VPIW" ("valid", "private", "L3 index", "L3 way") array 320, and an input/output (I/O) interface 330. Each VPIW array 320 includes an array of M-by-four entry pairs 322 (i.e., M entry pairs for each of the four ways of the VPIW array 320 for that reverse sub-directory 310). Each entry pair 322 includes a first entry for the "valid" and "private" information corresponding to the particular entry row and way column, and a second entry for the "L3 index" and "L3 way" corresponding to the particular entry row for the particular way (e.g., column). For example, the reverse directory 300 stores an entry for each L2 cache location (and the corresponding "valid" and "private" information), and each entry specifies an L3 cache location (according to its "index" and "way" information) that is associated with the L2 cache location.

As illustrated, the reverse directory 300 can interface with a number of input and output signals via the I/O interfaces 330. An L2 index 350 signal can select a target one of the entries in the reverse directory 300. Write enable 342 and a read enable 349 signals can place the reverse directory 300 into write (e.g., update) mode or read mode, respectively. The VPIW input 344 signals facilitate updating of data, in write mode, for the "valid", "private", "L3 index", and/or "L3 way" information of the selected entry (or entry pair 322). The VPIW output 346 signals facilitate reading of data, in read mode, for the "valid", "private", "L3 index", and/or "L3 way" information of the selected entry (or entry pair 322).

Figure 4:
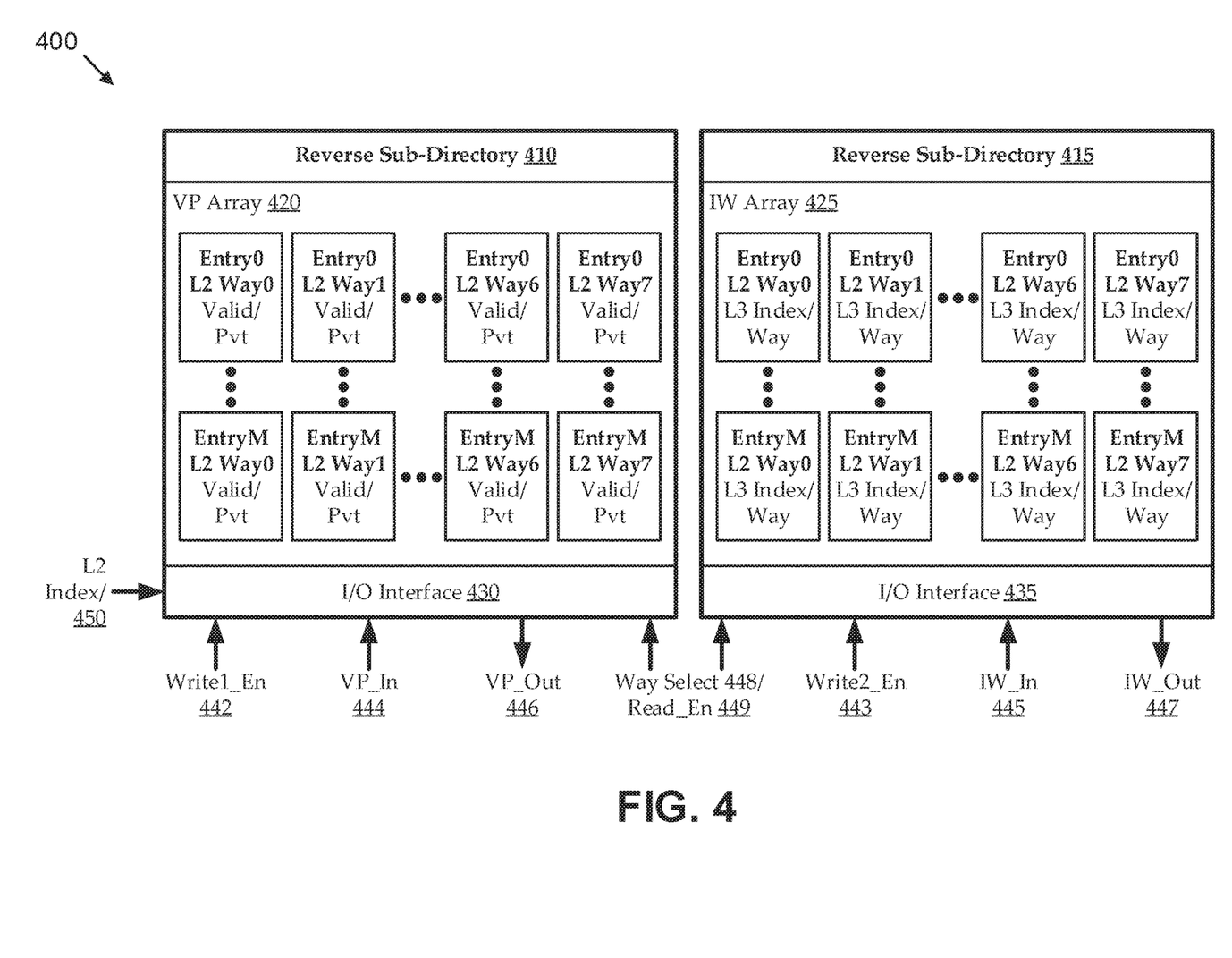
FIG. 4 shows a novel type of reverse directory implementation, according to various embodiments.

FIG. 4 shows a novel type of reverse directory 400 implementation, according to various embodiments. The illustrated reverse directory 400 is assumed to correspond with a particular L2 cache 116, and the reverse directory 400 is assumed to include an entry for each line in the corresponding L2 cache 116. It is further assumed that the L2 cache 116 is organized as an eight-way set-associative cache, such that addressing of the cache 116 can identify a set corresponding to a particular cache row, and the identified set can include eight different entries stored in each of eight different "way locations" (e.g., corresponding to eight columns in the cache). The entries within the L2 cache 116 contain data and instructions, whereas the corresponding entries within the reverse directory 400 contain indexing information specifying a location of the line within the L3 cache 170. To that end, the reverse directory 400 can also be organized according to an eight-way structure similar to that of the corresponding L2 cache 116.

As illustrated, the reverse directory 400 includes two reverse sub-directories 410,415. Like the reverse sub-directories 310 of FIG. 3, the reverse sub-directories 410,415 of FIG. 4 each includes an array of entries and an input/output (I/O) interface 430,435. However, in contrast to the reverse sub-directories 310 of FIG. 3, the reverse sub-directories 410,415 of FIG. 4 each includes entries for all eight ways. Further, the array of entries in the first sub-directory 410 is a "VP" array 420 (for "valid" and "private" information), and the array of entries in the second sub-directory 415 is an "IW" array 425 (for "L3 index" and "L3 way" information).

For example, the "VP" array 420 is an M-by-8 array of entries (i.e., M entries for each of the eight ways of the array for that reverse sub-directory 410,415), each storing "valid" and "private" information; and the "VP" array 420 is an M-by-8 array of entries, each storing "L3 index" and "L3 way" information.

As illustrated, the reverse directory 400 can interface with a number of input and output signals via the I/O interfaces 430,435. An L2 index 450 signal can select a target one of the entries in the reverse directory 400. "Write1_En" 442 can enable write mode for the first reverse sub-directory 410, "Write2_En" 443 can enable write mode for the second reverse sub-directory 415, and "Read_En" 449 can enable read mode for each or both reverse sub-directories 410,415. "VP_In" 444 can facilitate updating of "valid" and/or "private" data for the selected entry when the first reverse sub-directory 410 is write-enabled. "VP_Out" 446 can facilitate reading of "valid" and/or "private" data for the selected entry when the first reverse sub-directory 410 is read-enabled. "IW_In" 445 can facilitate updating "L3 index" and/or "L3 way" data for the selected entry when the second reverse sub-directory 415 is write-enabled. "IW_Out" 447 can facilitate reading of "L3 index" and/or "L3 way" data for the selected entry when the second reverse sub-directory 415 is read-enabled.

As described above, the reverse directory 400 effectively maintains a pointer in the reverse direction from each L2 cache entry to a corresponding L3 cache entry (e.g., as opposed to keeping a pointer to an L2 cache entry from each L3 cache entry). This can save memory because there are typically many fewer L2 cache entries than L3 cache entries. In particular, the "L3 index" and "L3 way" information in the reverse directory 400 (i.e., in the second reverse sub-directory 415) identified the index and way of the L3 cache entry corresponding to a particular L2 cache entry identified by L2 index 450. The "L3 index" and "L3 way" information can be updated in the reverse directory 400 when there is a change in association between the L2 and L3 cache entries.

For the sake of illustration, suppose a request to retrieve a L3 cache line is received at L3 cache from L2 cache. In some instances, the request can result in a "miss" in L3 cache, and the system can retrieve the requested line into L3 cache from memory (e.g., from off-chip memory, as illustrated in FIG. 1. This can invalidate an existing entry in L3 cache, which can cause corresponding entries in the reverse directory 400 to be invalidated. For example, in such instances, the first reverse sub-directory 410 can be write-enabled (e.g., by Write1_En 442) and the "valid" information in the appropriate entry of the VP array 420 can be updated. The line retrieved into L3 cache can be further sent to L2 cache (e.g., and further to L1 cache). The "L3 index" and "L3 way" information can also be updated in the second sub-directory 415, accordingly, so that the reverse directory 400 includes the appropriate reverse pointer from the L2 cache entry to the corresponding L3 cache entry containing the line. In some instances, "private" information in the first sub-directory 410 can also be updated to indicate whether data in the corresponding line is shared between multiple L2 caches.

In some instances, a request (e.g., a store hit on a target entry by another processor, a load miss, a store miss, etc.) can cause an update to the L3 cache. A lookup in L3 cache can indicate where the requested target entry is located (e.g., the L3 index and L3 way), and the location can be searched in the reverse directory 400 to determine which L2 caches contain the target entry. An invalidation message can be sent to each L2 cache that contains the entry, and the corresponding reverse directory entry can be updated to indicate that it has been invalidated. For example, the "valid" and/or "private" information can be updated, accordingly.

In typical operation of a multiprocessor system (e.g., the system 100 illustrated in FIG. 1), the L3 cache is likely to experience updates more frequently than cache misses, or the like. Accordingly, "valid" and/or "private" information (i.e., the first reverse sub-directory 410) is likely to be updated appreciably more frequently than the "L3 index" and/or "L3 way" information (i.e., the second reverse sub-directory). In the reverse directory 300 implementation of FIG. 3, regardless of the type of update, the entire VPIW array 310 is enabled for update, even if only the "valid" or "private" information is being updated. In the reverse directory 400 implementation of FIG. 4, updates to the "valid" and/or "private" information (which is likely to be more frequent) involves enabling only the first reverse sub-directory 410 for writing. As such, in the implementation of FIG. 4, a majority of write-mode operations is likely to update only the first sub-directory, which can appreciably reduce power consumption during those write mode operations (e.g., by approximately 50 percent).

Figure 5:
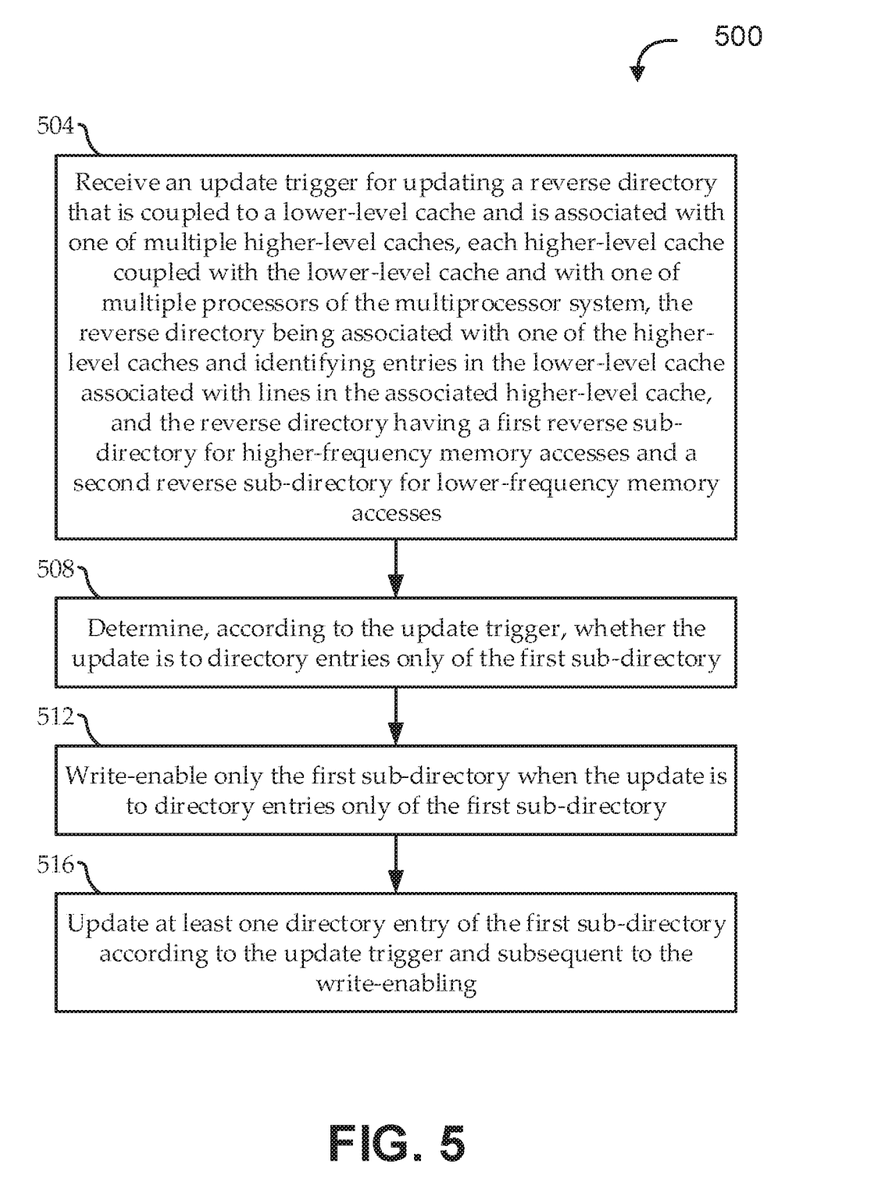
FIG. 5 shows a flow diagram of an illustrative method for reverse directory access in a multiprocessor system, according to various embodiments.

FIG. 5 shows a flow diagram of an illustrative method 500 for reverse directory access in a multiprocessor system, according to various embodiments. Embodiments of the method can be implemented using the systems described above or any other suitable system. Embodiments begin at stage 504 by receiving an update trigger for updating a reverse directory that is coupled to a lower-level cache and is associated with one of multiple higher-level caches. Each higher-level cache is coupled with the lower-level cache and with one of multiple processors of the multiprocessor system. The reverse directory is associated with one of the higher-level caches and identifies entries in the lower-level cache associated with lines in the associated higher-level cache. In some implementations, the reverse directory is one of multiple reverse directories of a reverse directory system coupled to the lower-level cache, and each reverse directory is associated with a respective one of the higher-level caches. Further, the reverse directory includes a first reverse sub-directory for higher-frequency memory accesses and a second reverse sub-directory for lower-frequency memory accesses. For example, as described above, the first reverse sub-directory can include "valid" information (e.g., and "private" information), and the second reverse sub-directory can include "way" information (e.g., L3 way information, and, in some implementations, L3 index information).

At stage 508, embodiments can determine, according to the update trigger, whether the update is to directory entries only of the first sub-directory. For example, it can be assumed that "valid" and/or "private" information tends to be updated appreciably more frequently than "index" or "way" information; and the determination at stage 508 can indicate whether only the "valid" and/or "private" information should be updated. At stage 512, embodiments can write-enable only the first sub-directory when the update is to directory entries only of the first sub-directory. At stage 516, embodiments can update at least one directory entry of the first sub-directory according to the update trigger and subsequent to the write-enabling. If the determination at stage 508 is that the update is not only to directory entries of the first sub-directory (i.e., that the update is to directory entries only, or also, of the second sub-directory), some embodiments can further write-enable the second sub-directory in response to determining that the update is not only to directory entries of the first sub-directory.

In some embodiments, receiving the update trigger can include receiving an update request that causes a target entry in the lower-level cache to be updated. In such embodiments, the method 500 can further query the reverse directory to determine whether the target entry is contained in the associated higher-level cache, if so, an invalidation request can be sent to the higher-level cache to invalidate the target entry, and a corresponding entry in the reverse directory can be updated to indicate that the target entry has been invalidated in the higher-level cache.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA) or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm, or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A multiprocessor system, comprising:
   a plurality of processors coupled with a plurality of higher-level caches;
   a lower-level cache coupled with the plurality of higher-level caches, such that each higher-level cache performs memory accesses through the lower-level cache; and
   a reverse directory system coupled to the lower-level cache and comprising a plurality of reverse directories, each reverse directory being associated with one of the plurality of higher-level caches and identifying entries in the lower-level cache associated with lines in the associated higher-level cache, each reverse directory comprising:
   a first reverse sub-directory for higher-frequency memory accesses; and
   a second reverse sub-directory for lower-frequency memory accesses.

2. The multiprocessor system of clam 1, wherein each reverse directory includes a fixed entry corresponding to each entry in the associated higher-level cache, and each fixed entry identifies an associated entry in the lower-level cache.

3. The multiprocessor system of clam 1, wherein:
   each higher-level cache is arranged as an n-way cache;
   the first reverse sub-directory of each reverse directory comprises an m-by-n array having m first entries for each of the n ways of the higher-level cache associated with the reverse directory; and
   the second reverse sub-directory of each reverse directory comprises an m-by-n array having m second entries for each of the n ways of the higher-level cache associated with the reverse directory.

4. The multiprocessor system of clam 1, wherein the reverse directory is updatable by selecting one of:
   enabling writing of only the first reverse sub-directory;

enabling writing of only the second reverse sub-directory; or enabling writing of both the first reverse sub-directory and the second reverse sub-directory.

5. The multiprocessor system of clam 1, wherein:

the first reverse sub-directory of each reverse directory comprises an array of first entries, each first entry containing valid information for a corresponding cache entry of the higher-level cache associated with the reverse directory; and the second reverse sub-directory of each reverse directory comprises an array of second entries, each second entry containing way information for a location in the lower-level cache corresponding to the cache entry of the higher-level cache.

6. The multiprocessor system of clam 5, wherein:

each first entry further contains private information for the corresponding cache entry of the higher-level cache associated with the reverse directory; and each second entry further contains index information for the location in the lower-level cache corresponding to the cache entry of the higher-level cache.

7. The multiprocessor system of clam 6, wherein:

the first reverse sub-directory of each reverse directory is coupled with a first write enable signal to enable writing of the valid information and/or the private information; and the second reverse sub-directory of each reverse directory is coupled with a second write enable signal to enable writing of the index information and/or the way information.

8. The multiprocessor system of clam 6, wherein:

the first reverse sub-directory of each reverse directory is coupled with a first read enable signal to enable reading of the valid information and/or the private information; and the second reverse sub-directory of each reverse directory is coupled with a second read enable signal to enable reading of the index information and/or the way information.

9. The multiprocessor system of clam 1, wherein:

the lower-level cache is coupled with an off-chip memory.

10. The multiprocessor system of clam 1, wherein the lower-level cache operates to:

receive a request from a higher-level cache to retrieve a line from the lower-level cache;

send the line to the higher-level cache for storage in the higher-level cache when the line is present in the lower-level cache; and update the reverse directory associated with the higher-level cache to indicate that the line is stored in the higher-level cache.

11. The multiprocessor system of clam 1, wherein the lower-level cache operates to:

receive an update request that causes a target entry in the lower-level cache to be updated;

perform a lookup in the reverse directory system to determine if the target entry is contained in one or more of the higher-level caches; and for each higher-level cache that contains the target entry:

send an invalidation request to the higher-level cache to invalidate the target entry; and update a corresponding entry in the reverse directory associated with the higher-level cache to indicate that the target entry has been invalidated in the higher-level cache.

12. The multiprocessor system of clam 1, further comprising:

a single semiconductor chip having, disposed thereon, the plurality of processors, the plurality of higher-level caches, the lower-level cache, and the reverse directory system.

13. The multiprocessor system of clam 1, wherein:

the lower-level cache is an L3 cache; and each of the plurality of higher-level caches is an L2 cache organized as a write-through cache, so that an update to any of the higher-level caches is automatically written through to the lower-level cache.

14. A single-chip multiprocessor system comprising:

a semiconductor chip;

a plurality of higher-level caches disposed on the semiconductor chip;

a plurality of processors disposed on the semiconductor chip and coupled with the plurality of higher-level caches;

a lower-level cache disposed on the semiconductor chip and coupled with the plurality of higher-level caches, such that each higher-level cache performs memory accesses through the lower-level cache; and a reverse directory system disposed on the semiconductor chip and coupled to the lower-level cache, the and reverse directory system comprising a plurality of reverse directories, each reverse directory being associated with one of the plurality of higher-level caches and identifying entries in the lower-level cache associated with lines in the associated higher-level cache, and each reverse directory comprising a first reverse sub-directory for higher-frequency memory accesses, and a second reverse sub-directory for lower-frequency memory accesses.

15. A method for reverse directory access in a multiprocessor system, the method comprising:

receiving an update trigger for updating a reverse directory that is coupled to a lower-level cache and is associated with one of a plurality of higher-level caches, each higher-level cache coupled with the lower-level cache and with one of a plurality of processors of the multiprocessor system, the reverse directory being associated with one of the plurality of higher-level caches and identifying entries in the lower-level cache associated with lines in the associated higher-level cache, and the reverse directory comprises a first reverse sub-directory for higher-frequency memory accesses and a second reverse sub-directory for lower-frequency memory accesses;

determining, according to the update trigger, whether the update is to directory entries only of the first sub-directory;

write-enabling only the first sub-directory when the update is to directory entries only of the first sub-directory: and updating at least one directory entry of the first sub-directory according to the update trigger and subsequent to the write-enabling.

16. The method of claim 15, wherein the reverse directory is one of a plurality of reverse directories of a reverse directory system coupled to the lower-level cache, each reverse directory associated with a respective one of the higher-level caches.

17. The method of claim 15, further comprising:

further write-enabling the second sub-directory in response to determining that the update is not only to directory entries of the first sub-directory.

18. The method of claim 15, wherein:
the first reverse sub-directory comprises an array of first entries, each first entry containing valid information for a corresponding cache entry of the associated higher-level cache; and
the second reverse sub-directory comprises an array of second entries, each second entry containing way information for a location in the lower-level cache corresponding to the cache entry of the associated higher-level cache.

19. The method of claim 15, wherein:
each higher-level cache is arranged as an n-way cache;
the first reverse sub-directory comprises an m-by-n array having in first entries for each of the n ways of the associated higher-level cache; and
the second reverse sub-directory comprises an m-by-n array having m second entries for each of the n ways of the associated higher-level cache.

20. The method of claim 15, wherein receiving the update trigger comprises receiving an update request that causes a target entry in the lower-level cache to be updated, and further comprising:
querying the reverse directory to determine whether the target entry is contained in the associated higher-level cache;
sending an invalidation request to the higher-level cache to invalidate the target entry when the target entry is contained in the associated higher-level cache; and
updating a corresponding entry in the reverse directory to indicate that the target entry has been invalidated in the higher-level cache when the target entry is contained in the associated higher-level cache.

* * * * *